US011137016B2

(12) United States Patent
Leichti et al.

(10) Patent No.: US 11,137,016 B2
(45) Date of Patent: *Oct. 5, 2021

(54) WASHER WITH SHEAR TUBE

(71) Applicant: Simpson Strong-Tie Company, Inc., Pleasanton, CA (US)

(72) Inventors: Robert J. Leichti, San Ramon, CA (US); Jin-Jie Lin, Livermore, CA (US)

(73) Assignee: Simpson Strong-Tie Company, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/378,433

(22) Filed: Apr. 8, 2019

(65) Prior Publication Data

US 2019/0242427 A1    Aug. 8, 2019

Related U.S. Application Data

(62) Division of application No. 15/279,193, filed on Sep. 28, 2016, now Pat. No. 10,253,801.

(60) Provisional application No. 62/234,425, filed on Sep. 29, 2015.

(51) Int. Cl.
| | |
|---|---|
| *F16B 43/00* | (2006.01) |
| *E04B 1/24* | (2006.01) |
| *F16B 5/02* | (2006.01) |
| *E04B 1/26* | (2006.01) |
| *F16B 35/00* | (2006.01) |

(52) U.S. Cl.
CPC ............ *F16B 43/00* (2013.01); *E04B 1/2403* (2013.01); *E04B 1/2608* (2013.01); *F16B 5/02* (2013.01); *F16B 35/00* (2013.01); *E04B 2001/2644* (2013.01); *E04B 2001/2684* (2013.01)

(58) Field of Classification Search
CPC ............ F16B 5/02; F16B 35/00; F16B 43/00
USPC .................................................. 411/368, 396
See application file for complete search history.

(56) References Cited

U.S. PATENT DOCUMENTS

| | | | |
|---|---|---|---|
| 156,699 | A | 11/1874 | Fuller |
| 937,199 | A | 10/1909 | Willard |
| 970,423 | A | 9/1910 | Cunningham |
| 1,044,055 | A | 11/1912 | Johnson et al. |

(Continued)

FOREIGN PATENT DOCUMENTS

| | | |
|---|---|---|
| EP | 2246578 A1 | 3/2010 |
| EP | 2226440 A2 | 3/2011 |

(Continued)

OTHER PUBLICATIONS

International Search Report and Written Opinion of the International Searching Authority, Application No. PCT/US2016/05219, dated Jan. 3, 2017, 11 pages, European Patent Office, Rijswijk, NL.

(Continued)

*Primary Examiner* — Roberta S Delisle
(74) *Attorney, Agent, or Firm* — Charles R. Cypher; James R. Cypher

(57) ABSTRACT

A fastener system attaches a connector or other upper member to a lower structural member such as a post or beam. The fastener systems consists of a fastener having an extending shank that is driven into a lower structural member and the fastener is received by a washer that also has an extending tube, and the extending tube of the washer is received by the connector or upper member.

20 Claims, 21 Drawing Sheets

(56) References Cited

U.S. PATENT DOCUMENTS

| | | | |
|---|---|---|---|
| 1,301,302 A | | 4/1919 | Nolan |
| 1,640,650 A | | 8/1927 | Ehrhardt |
| 1,674,258 A | | 6/1928 | Obergfell et al. |
| 2,111,110 A | | 3/1938 | Deniston, Jr. et al. |
| 3,156,281 A | | 11/1964 | Demi |
| 3,174,383 A | * | 3/1965 | Heil ................ F16B 23/00 411/405 |
| 3,212,387 A | | 10/1965 | Madansky |
| 3,270,610 A | | 9/1966 | Knowlton |
| 3,305,987 A | | 2/1967 | Weaver |
| 3,315,720 A | | 4/1967 | Gutshall |
| 3,852,931 A | | 12/1974 | Morse et al. |
| 4,238,165 A | | 12/1980 | Wagner |
| 4,257,465 A | | 3/1981 | Berg |
| 4,361,997 A | * | 12/1982 | DeCaro ............. E04D 3/3603 411/161 |
| 4,380,413 A | * | 4/1983 | Dewey .............. F16B 43/02 411/161 |
| 4,540,322 A | | 9/1985 | Coffia |
| 4,543,763 A | | 10/1985 | Ernst et al. |
| 4,630,984 A | * | 12/1986 | Reinwall ........... E04D 3/3603 411/368 |
| 4,632,616 A | | 12/1986 | Sidoti |
| 4,884,932 A | * | 12/1989 | Meyer .............. E04D 3/3603 411/373 |
| 4,988,351 A | | 1/1991 | Paulos et al. |
| 5,082,412 A | * | 1/1992 | Thomas ............ E04D 3/3603 411/368 |
| 5,175,665 A | | 12/1992 | Pegg |
| 5,201,627 A | | 4/1993 | Biedenbach |
| 5,217,339 A | * | 6/1993 | O'Connor ......... E04D 3/3603 411/161 |
| 5,628,599 A | | 5/1997 | Eakin |
| 5,711,711 A | | 1/1998 | Schmidt, Jr. |
| 5,779,380 A | | 7/1998 | Knapp |
| 5,908,278 A | * | 6/1999 | Hasan .............. E04D 5/145 411/533 |
| D418,048 S | | 12/1999 | Chan |
| 6,105,332 A | | 8/2000 | Boyadjian |
| 6,186,698 B1 | | 2/2001 | Knapp |
| 6,383,187 B2 | | 5/2002 | Tormala et al. |
| 6,565,303 B1 | * | 5/2003 | Riccitelli ........... E04D 3/3603 411/368 |
| 7,004,436 B2 | | 2/2006 | Knapp |
| D549,091 S | | 8/2007 | McIntyre et al. |
| D557,131 S | | 12/2007 | Liu |
| 7,306,418 B2 | | 12/2007 | Kornblum |
| 7,402,106 B2 | | 7/2008 | Yin-Feng |
| D581,776 S | | 12/2008 | Yin-Feng |
| D585,731 S | | 2/2009 | Carrillo, Sr. et al. |
| D601,004 S | | 9/2009 | Hagins |
| D610,717 S | | 2/2010 | Lin |
| 7,784,150 B2 | * | 8/2010 | Anderson ........... B61D 3/18 105/355 |
| 7,866,931 B2 | | 1/2011 | Murtha |
| 7,877,939 B2 | | 2/2011 | Knapp |
| D637,071 S | | 5/2011 | Gaudron et al. |
| 7,938,608 B1 | | 5/2011 | Jordan |
| 8,002,509 B2 | * | 8/2011 | Rosemann ........... F16B 5/02 24/457 |
| D644,921 S | | 9/2011 | Hsu |
| 8,347,566 B2 | | 1/2013 | Knapp |
| D682,666 S | | 5/2013 | Wigboldy |
| 8,454,291 B2 | | 6/2013 | Guyomard |
| D696,930 S | | 1/2014 | Rodenhouse et al. |
| D696,932 S | | 1/2014 | Rodenhouse et al. |
| 8,894,339 B2 | | 11/2014 | Yin-Feng |
| 8,904,719 B2 | | 12/2014 | Knapp |
| 9,027,897 B2 | | 5/2015 | Hill |
| D733,546 S | | 7/2015 | Balzhiser |
| 10,253,801 B2 | | 4/2019 | Leichti |
| 2002/0062617 A1 | * | 5/2002 | diGirolamo ......... E04B 2/767 52/688 |
| 2006/0067804 A1 | | 3/2006 | Kornblum |
| 2007/0036630 A1 | | 2/2007 | Butzer et al. |
| 2007/0154258 A1 | | 7/2007 | Knapp |
| 2011/0173916 A1 | | 7/2011 | Knapp |
| 2013/0334389 A1 | | 12/2013 | Hill |
| 2013/0334392 A1 | | 12/2013 | Hill |
| 2013/0336743 A1 | | 12/2013 | Hill |
| 2013/0340375 A1 | | 12/2013 | Hill |
| 2014/0007541 A1 | | 1/2014 | Hill |
| 2014/0369787 A1 | | 12/2014 | Hill |

FOREIGN PATENT DOCUMENTS

| | | |
|---|---|---|
| EP | 2886731 A1 | 6/2015 |
| EP | 2664724 B1 | 10/2015 |
| FR | 2751355 | 1/1998 |
| JP | 2001-12442 | 1/2001 |
| WO | PCT/GB91/01709 | 4/1992 |
| WO | WO 96/11311 | 4/1996 |
| WO | WO 00/18309 | 4/2000 |
| WO | WO 2007/131166 A2 | 11/2007 |
| WO | WO 2013/034978 A2 | 3/2013 |
| WO | WO 2013/092822 A2 | 6/2013 |
| WO | WO 2017/058941 | 4/2017 |

OTHER PUBLICATIONS

"90° SWG ASSY Cup Washer," Brochure, available as early as Jan. 19, 2016, 3 pages, MyTiCon Timber Connectors, Surrey, Canada.

Closen, Max, "Steel to Wood Connection Systems," Brochure, available as early as Jan. 19, 2016, 6 pages, MyTiCon timer Connectors, Surrey, Canada.

"45° Wedge Washer," website page, copyright 2011-2016, MyTiCon Timber Connectors, Surrey, Canada.

"Swan Secure Fasteners," Catalog, Jul. 2009, pp. front cover, 19-29, 37-40, 52-53, 62-63, 69-70, 74-82, back cover, C-SSTSWAN09, Simpson Strong-Tie Company, Inc., Pleasanton, CA, USA.

"Wood Construction Connectors," Catalog, Jan. 1, 2013, pp. front cover, 9, 22, 24-27, 42-45, 128, 163, 176, 184-185, 194, 208, back cover, C-2013, Simpson Strong-Tie Company, Inc., Pleasanton, CA, USA.

"Fastening Systems; Includes Quik Drive Auto-Feed Screw Driving Systems," Catalog, Aug. 2011, pp. front cover, 15-16, 19, 21-22, 24-29, 76-133, 160-162, 166-182, back cover, C-FS11, Simpson Strong-Tie Company, Inc., Pleasanton, CA, USA.

"Anchoring and Fastening Systems for Concrete and Masonry," Catalog, Jan. 1, 2012, pp. front cover, 4-5, 8, 95-96, 106-107, 110-111, 122-123, 127-130, 133-134, 146, 157-177, 180-186, 201-214, 242-243, back cover, C-SAS-2012, Simpson Strong-Tie Company, Inc., Pleasanton, CA, USA.

"OZCO 2015 New Product Launch", Catalog, 2015, cover and 4 pages, OZCO Building Products, Richardson, TX, USA.

"OZCO Decorative Structural Wood Connectors", website page, Jan. 4, 2016, 1 page, OZCO Building Products, Richardson, TX, USA.

"How to choose a wood connector face plate size for exposed beams", website page, Jan. 5, 2016, 3 pages, Old West Iron, Felt, ID, USA.

Old West Iron Connectors, web pages, Feb. 15, 2017, 8 pages, Old West Iron, Felt, ID, USA.

"Wood to Wood Connector Gallery," web page, Jun. 2012, 2 pages, Old West Iron DBA Teton Iron, Tetonia, ID, USA.

\* cited by examiner

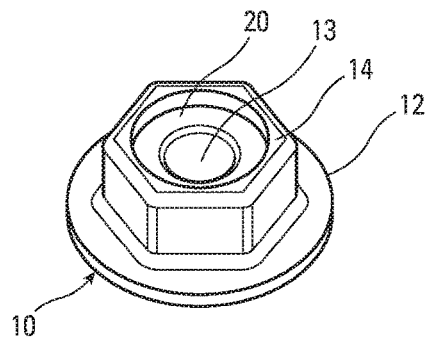 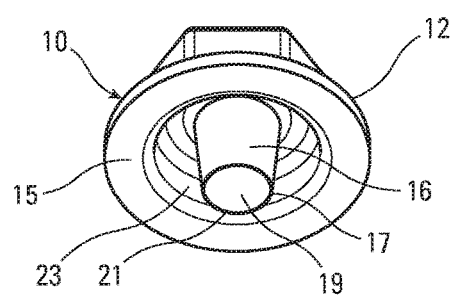
Fig. 4    Fig. 5
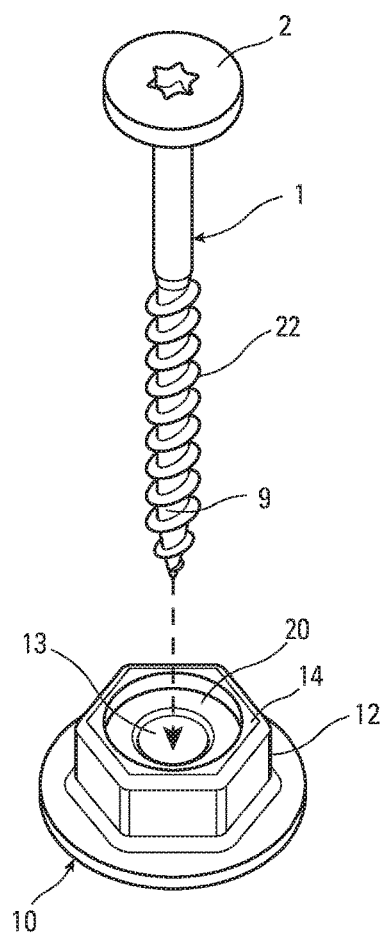 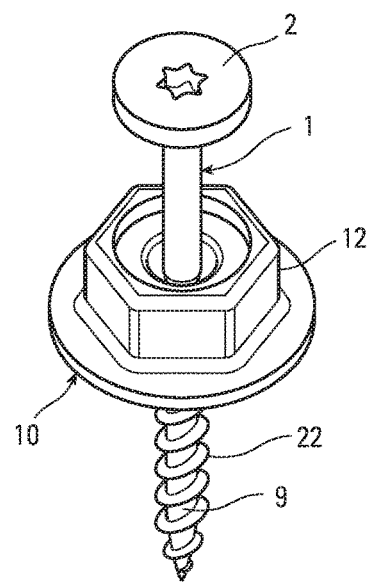 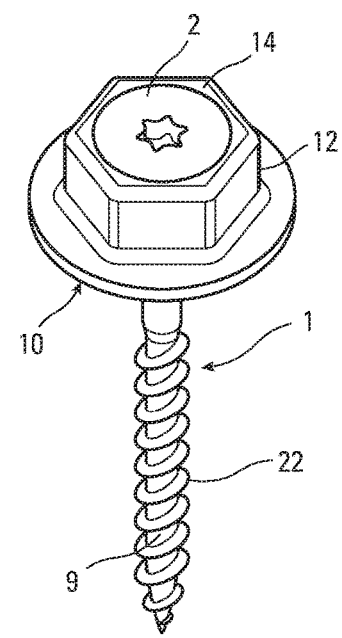
Fig. 6    Fig. 7    Fig. 8

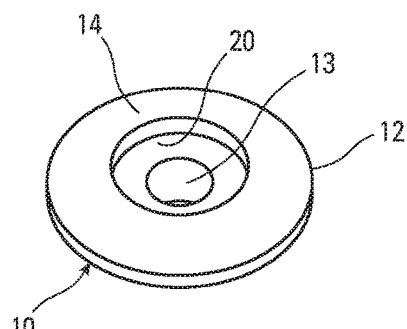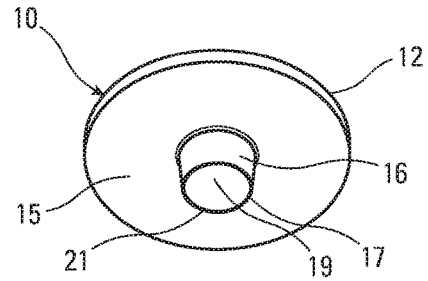
Fig. 21  Fig. 22
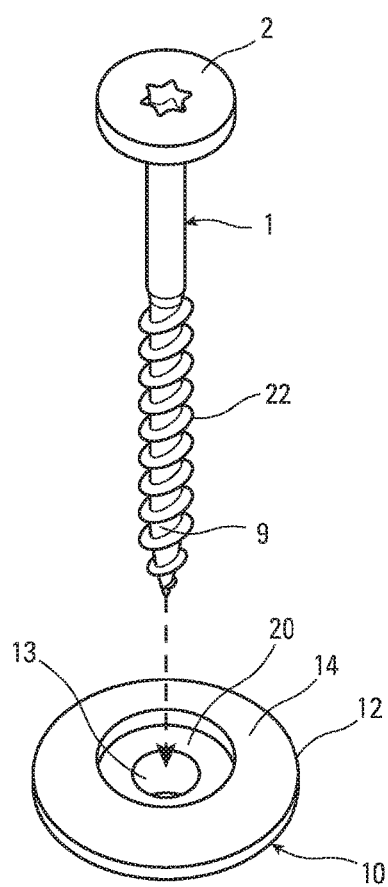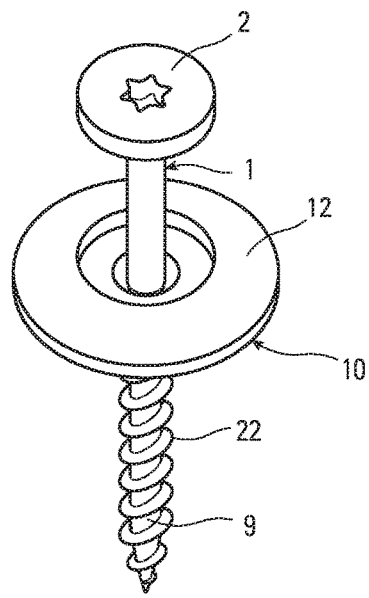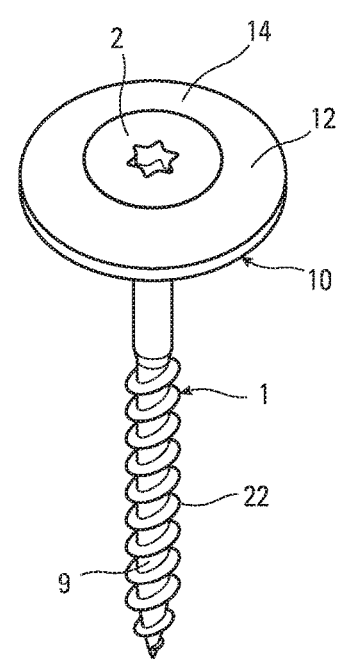
Fig. 23  Fig. 24  Fig. 25

WASHER WITH SHEAR TUBE

The present invention relates to an improved fastener system for attaching a connector or other upper member to a lower structural member such as a post or beam, in particular the improved fastener consists of a fastener having an extending shank that is driven into a lower structural member and the fastener is received by a washer that also has an extending tube, and the extending tube of the washer is received by the connector or upper member and is also, preferably received in the structural member.

There are a number of patented fastener and washer systems.

U.S. Pat. No. 2,111,110, granted to A. J. Deniston, Jr., et al, on Apr. 21, 1937, teaches using an enlarged sealing head or washer with a nail or screw to secure sheathing and similar members to a roof or similar structure. The fastener used is formed with a special, enlarged shank portion, or alternatively an annular groove or series of notches, below the head of the fastener which is designed to resist pull-out of the fastener. The sealing head is made from lead or a softer material than the fastener head and is formed with a narrowing, depending shank that extends to the enlarged shank portion and closely receives the upper portion of the shank of the fastener. The sealing head is deformed by the driving of the nail or screw and helps seal the opening in the sheathing.

U.S. Pat. No. 3,305,987, granted to Floyd E. Weaver, et al, on Feb. 28, 1967, teaches using an enlarged, shear washer with an anchored bolt to secure together two structural members in a building. The shear washer is formed with an annular outer depending flange or load-supporting portion at is periphery that has cutting flutes or grooves and teeth that allow it to cut into one of the structural members. The shear washer is either threaded onto the bolt, itself, or the shear washer is driven into wooden structural member by the operation of threading a standard nut onto the bolt that is keyed with the shear washer. The shear washer improves the strength of the connection.

U.S. Pat. No. 5,201,627, granted to Marita Biedenbach on Apr. 13, 1993, teaches using a ring-shaped washer with a self-drilling, wood screw. The ring-shaped washer has a pair of downwardly depending annular edges that are pushed into the wood member when the screw is driven. These depending edges are disposed parallel to the shank of the fastener. The ring-shaped washer prevents over-driving of the fastener and helps to prevent the wood from splitting. According to Biedenbach, the ring-shaped washer translates forces from the screw to the structural member at right angles to shank of the screw. Also according to Biedenbach, this redirection of forces reduces wedge effects and reduces the likelihood of splitting of the structural member.

U.S. Pat. No. 8,544,291, granted to Jean-Nicolas Guyomard on Jun. 4, 2013, teaches a washer with protruding elements used with a screw to better anchor an "element" such as a headlight to a "holder" such as the front face of a vehicle. The protruding elements of the washer are located on the peripheral edge and the internal edge of the opening in the washer to connect to both the "element" and the "holder".

US Patent Publication 2013/0336743A1, applied for by Ian A. Hill, and published Dec. 19, 2013, teaches a fastener that is used with a decorative washer. The head of the fastener and the decorative washer are shaped to give the appearance that the fastener and washer are a one-piece, headed bolt, giving the connection a particular aesthetic.

The prior art inventions teach washers that either deform while being installed to help seal the connection or they have teeth, protruding members or are otherwise formed to positively engage with and/or deform the upper element or member in the connection.

SUMMARY OF THE INVENTION

The present invention provides a shear washer that is installed as quickly and in the same manner as a standard washer, yet provides improved fastener shear resistance.

The present invention provides a shear washer that is not designed to deform, nor does it deform or bite into the upper member or connector, although the shear tube of the shear washer can engage the opening in the connector or upper member that also receives the fastener.

In one embodiment, the present invention provides a shear washer that engages with the lower or anchoring structural member into which the fastener is driven.

In one embodiment of the present invention, a connection is provided between an anchoring structural member and an upper member with the anchoring structural member having an upper surface, and the upper member or connector having an upper surface and a lower surface. The lower surface of the upper member interfaces with the upper surface of the anchoring structural member. The upper member has a passage between the upper surface and the lower surface. The connection includes a fastener and a washer. The washer has a central body with a passage there through, a top surface and a bottom surface. The washer is formed with an extending tube that extends from the central body toward the anchoring structural member and past the bottom surface of the central body. The bottom surface of the central body interfaces with the upper surface of the upper member without deforming the upper surface of the upper member. The central body also has a bearing surface opposed to the bottom surface of the central body. The extending tube has a passage that communicates with the passage through the central body. The extending tube of the washer is received by the passage of the upper member without deforming the passage of the upper member. The fastener has a head and an extending shank. The extending shank of the fastener is received in the anchoring structural member and passes through the passage in the upper member and the passage in the extending tube and the passage in the central body of the washer. The head of the fastener has an underside that interfaces with the bearing surface of the central body of the washer.

In one preferred embodiment, the extending tube can be formed with a cutting edge.

In another preferred embodiment of the present invention, the extending shank of the fastener makes contact with the passage of the extending tube.

In the preferred embodiment, the fastener is preferably a screw.

BRIEF DESCRIPTION OF THE DRAWINGS

FIG. 4 is an upper perspective view of one embodiment of the separate washer that forms part of the connection of the present invention.

FIG. 5 is a lower perspective view of the separate washer that forms part of the connection of the present invention.

FIG. 6 is an exploded view of the separate screw and separate washer with a dotted line and arrow head showing how the separate screw is inserted into the washer.

FIG. 7 is an upper perspective view of the separate screw partially inserted into the separate washer;

FIG. 8 is an upper perspective view of the screw inserted fully into the washer of the present invention.

FIG. 21 is an upper perspective view of an alternate embodiment of the separate washer that forms part of the connection of the present invention.

FIG. 22 is a lower perspective view of the separate washer of FIG. 21 that forms part of the connection of the present invention.

FIG. 23 is an exploded view of the separate screw and separate washer of FIG. 21 with a dotted line and arrow head showing how the separate screw is inserted into the washer.

FIG. 24 is an upper perspective view of the separate screw partially inserted into the separate washer;

FIG. 25 is an upper perspective view of the screw inserted fully into the washer of FIG. 21 of the present invention.

DETAILED DESCRIPTION OF THE INVENTION

Figure 1:
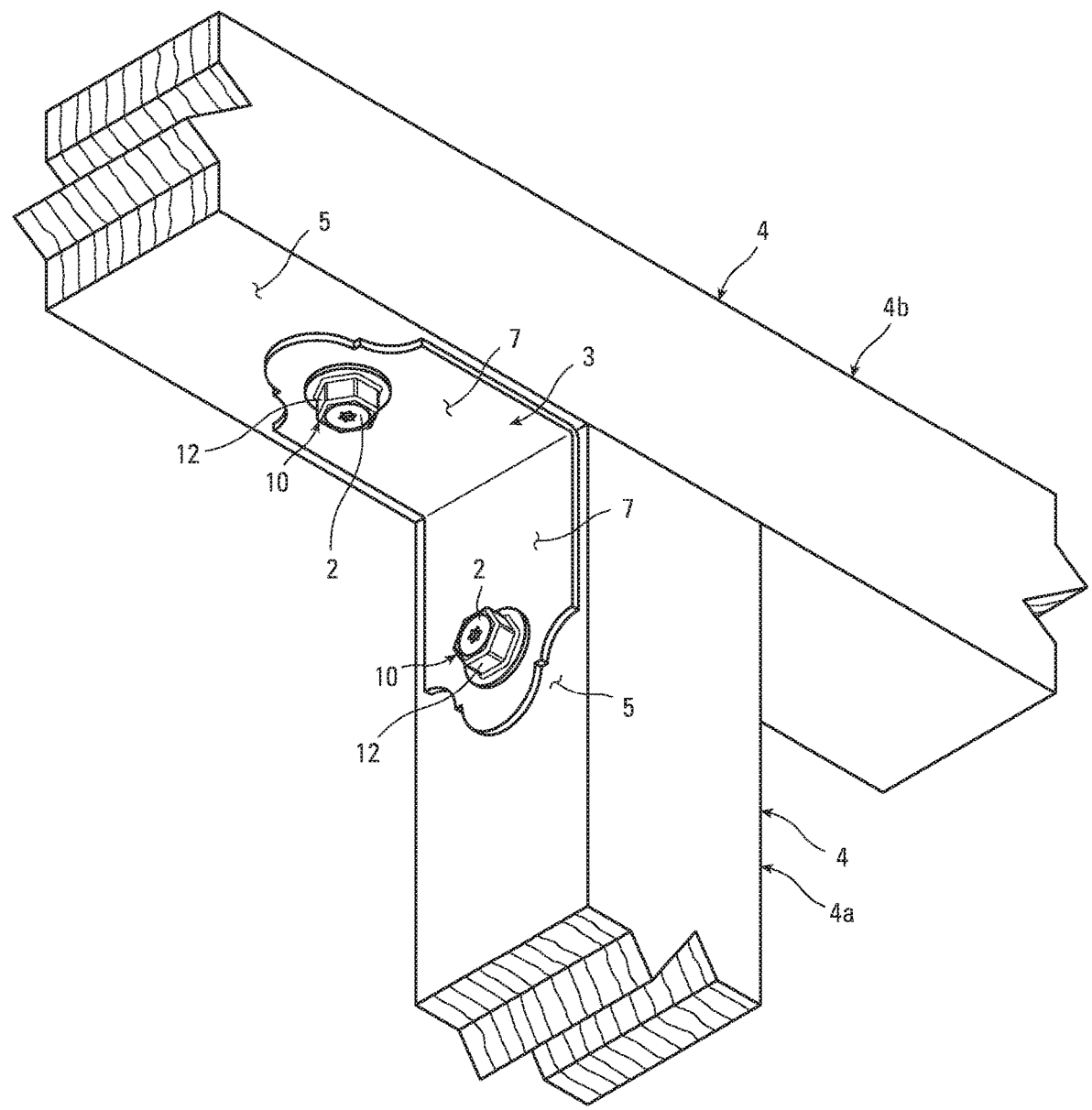
FIG. 1 is a perspective view of a connection made according to the present invention.

As shown in FIG. 1, the fastener 1, having a head 2, of the present invention attaches a connector or anchored member 3 to an anchoring structural member 4. As shown in FIG. 1 the connector 3 attaches to two different anchoring structural members 4, a post 4*a* and a beam 4*b*. The fastener 1 attaches a connector or upper member 3 to the anchoring structural member 4 by means of an extending shank 9.

Figure 2:
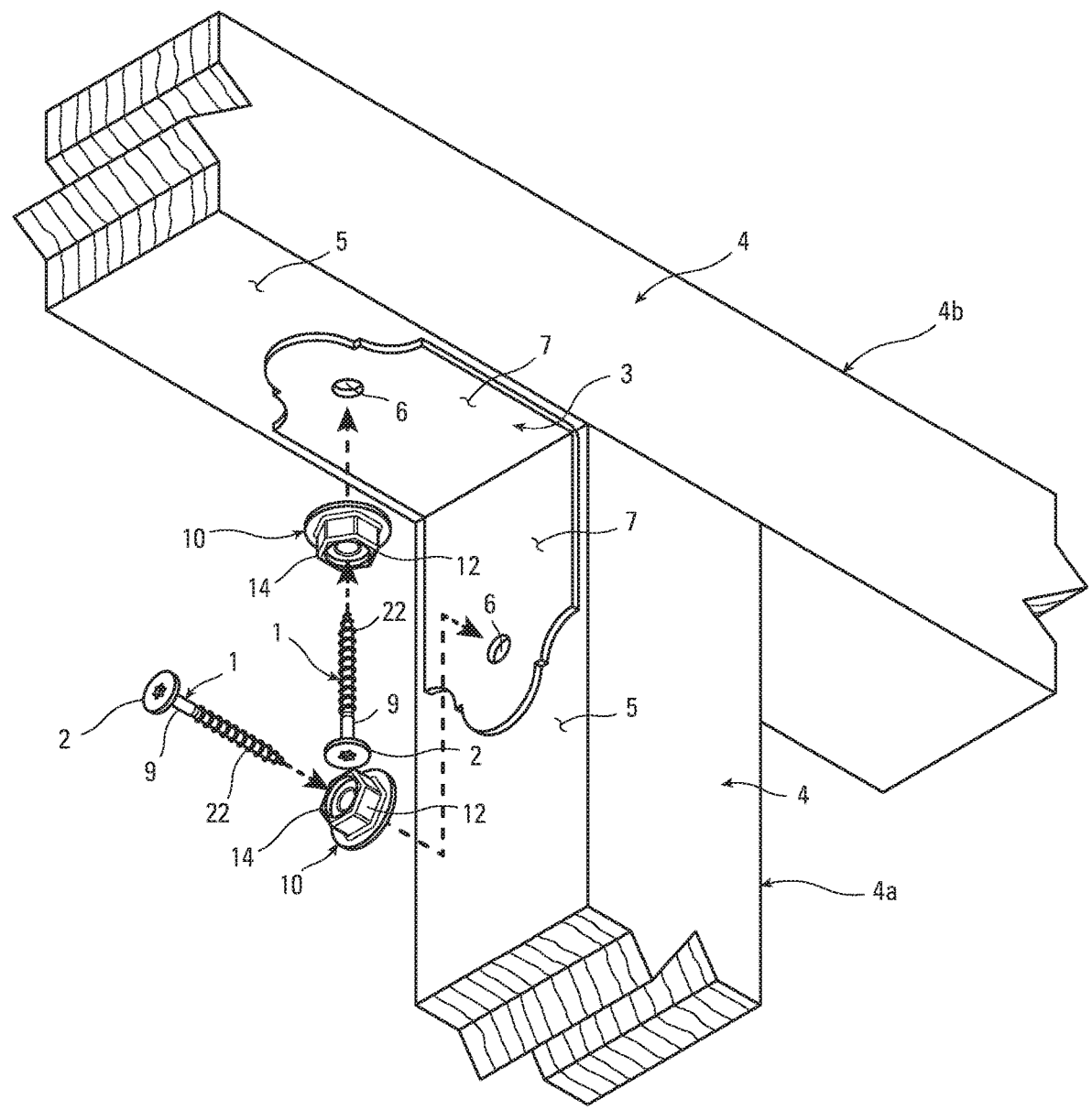
FIG. 2 is an exploded, perspective view of a connection made according to the present invention shown in FIG. 1.
Figure 3:
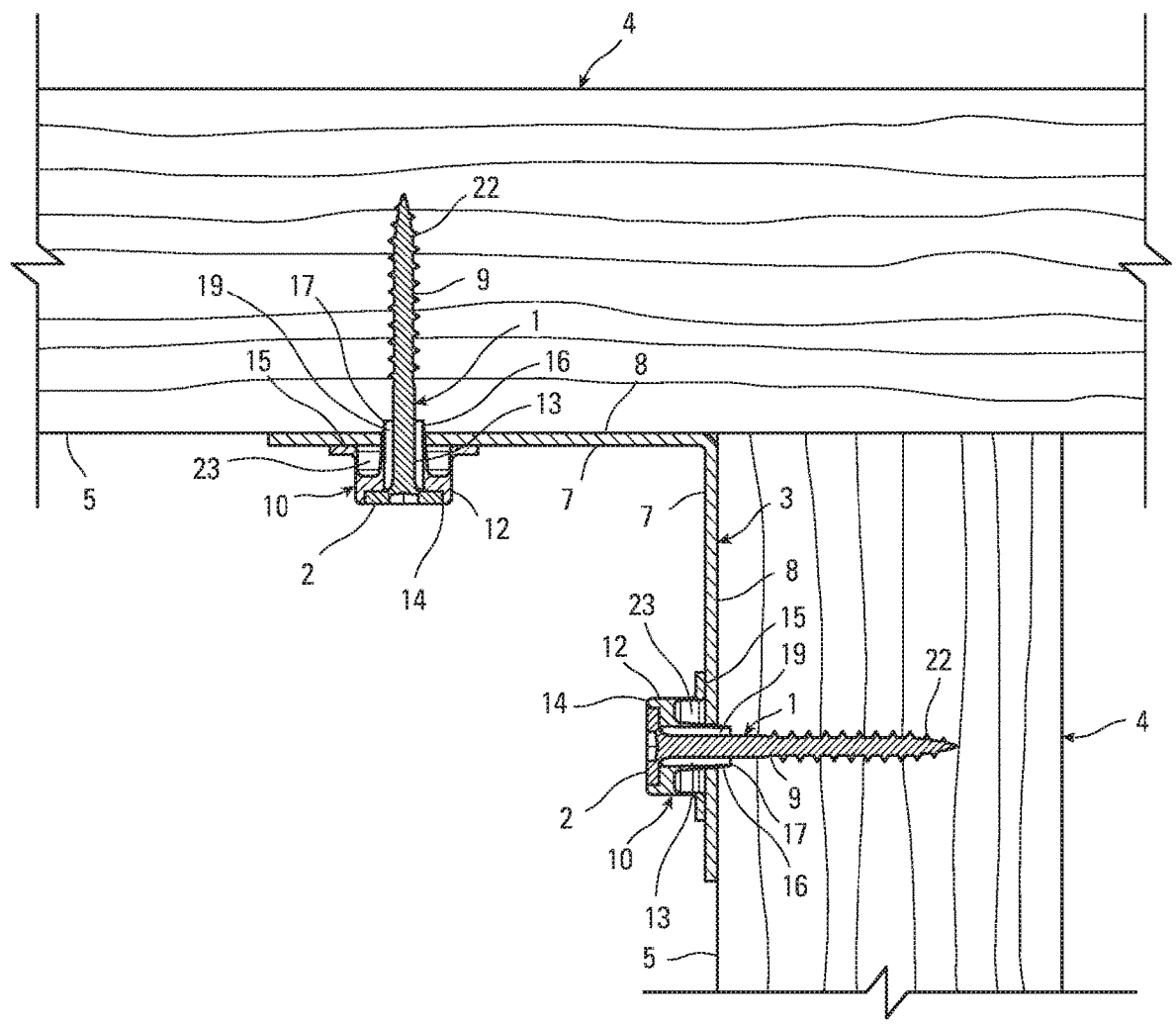
FIG. 3 is a sectional, side view of the connection shown in FIG. 1.
Figure 9:
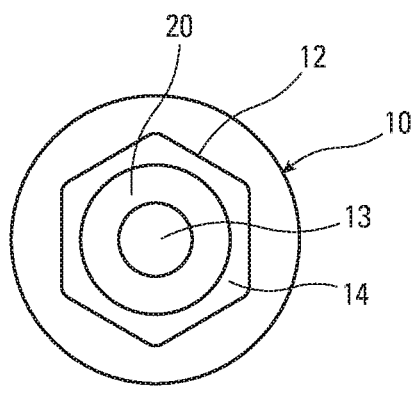
FIG. 9 is a top view of the separate washer that forms part of the present invention.

As shown in FIG. 3, the anchoring structural member 4 has an upper surface 5. The upper member or connector 3 has an upper surface 7 and a lower surface 8. The lower surface 8 of the upper member 3 interfaces with the upper surface 5 of the anchoring structural member 4. The upper member 3 has a passage 6 between the upper surface 7 and the lower surface 8. The passage 6 can be a notch in the upper member 3 or, as shown in FIG. 2, an opening through upper member 3 with a closed peripheral edge.

As shown in FIGS. 2, 4 and 5, the washer 10 of the present invention has a central body 12 with a passage 13 there through, a top surface 14 and a bottom surface 15. The central body 12 of washer 10 can be preferably shaped to resemble a typical hexagonal nut or bolt head with a circular, laterally extending washer beneath the nut.

The washer 10 is formed with an extending tube 16 that extends from the central body 12 toward, and preferably, into the anchoring structural member 4. In one preferred embodiment, the extending tube 16 can be formed with a cutting edge 17.

The extending tube 16 of washer 10 is driven into the lower or anchoring structural member 4 by fastener 1, which is preferably a screw. The underside 18 of the head 2 of the screw 1 pushes the extending tube 16 of the washer 10 into the upper surface 5 of the structural member 4.

Figure 39:
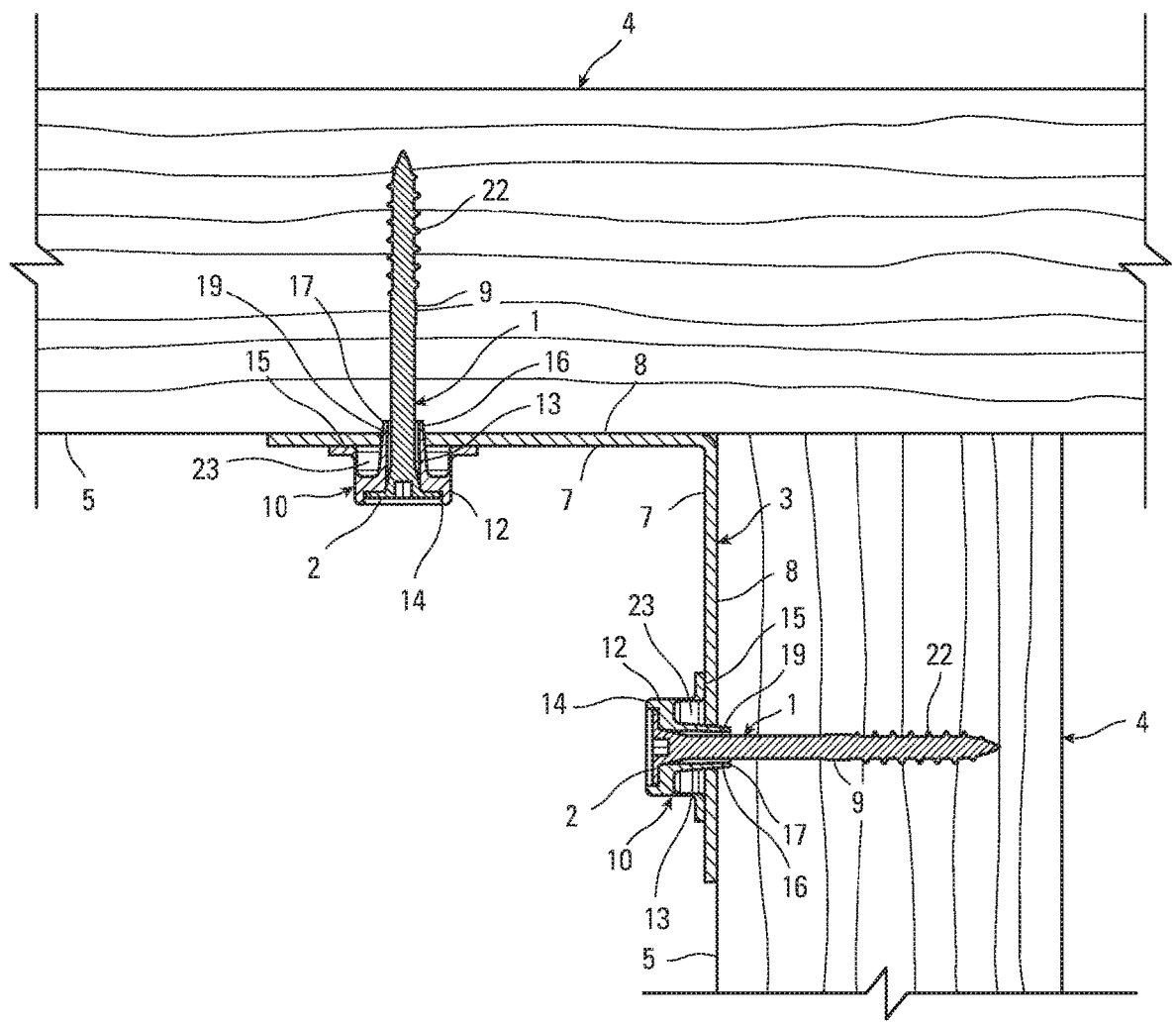
FIG. 39 is a sectional, side view of the connection.

As shown best in FIGS. 4 and 5, the washer 10 has a central body 12 with a passage 13 through the central body 12. The central body 12 has a bottom surface 15 with the bottom surface 15 of the central body 12 interfacing with the upper surface 7 of the upper member 3 without deforming the upper surface 7 of the upper member 3. The central body 12 also has a bearing surface 20 opposed to the bottom surface 15 of the central body 12. The washer 10 is also formed with an extending tube 16 that extends from the central body 12 and extends past the bottom surface 15 of the central body 12. The extending tube 16 has a passage 19 that communicates with the passage 13 through the central body 12. The extending tube 16 of the washer 10 is received by the passage 6 of the upper member 3 without deforming the passage 6 of the upper member 3. As shown in FIG. 39, the upper portion of the passage 13 near the bearing surface 20 is formed to conform closely to the shape of the portion of the shank 9 that it receives. This is the portion of the shank 9 just below the head 2 of the fastener 1.

As shown in FIGS. 2 and 3, the fastener 1 has a head 2 and an extending shank 9. The extending shank 9 of the fastener 1 is received in the anchoring structural member 4 and passes through the passage 6 in the upper member 3 and the passage 19 in the extending tube 16 and the passage 13 in the central body 12 of the washer 10. The head 2 of the fastener 1 has an underside 18 that interfaces with the bearing surface 20 of the central body 12 of the washer 10.

As shown in FIG. 3, the extending tube 16 closely interfaces with the passage 6 in the upper member 3, and preferably, the extending tube 16 of the washer 10 is also received in the anchoring structural member 4.

Figure 10:
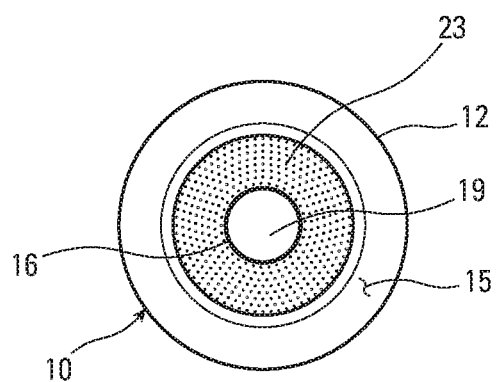
FIG. 10 is a bottom view of the separate washer that forms part of the present invention.
Figure 11:
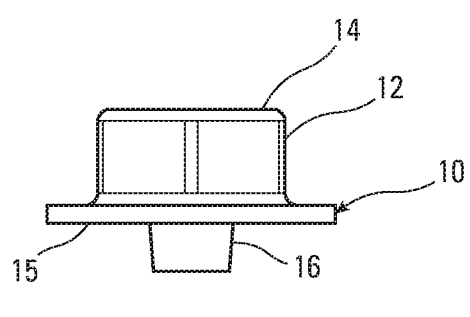
FIG. 11 is a front view of the separate washer that forms part of the present invention.
Figure 12:
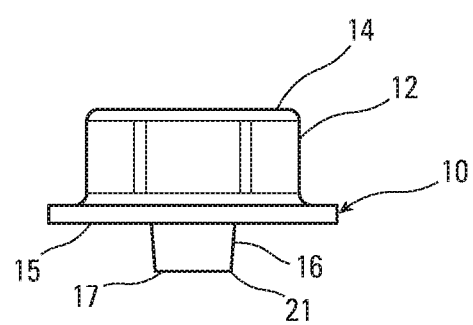
FIG. 12 is a side view of the separate washer that forms part of the present invention.
Figure 13:
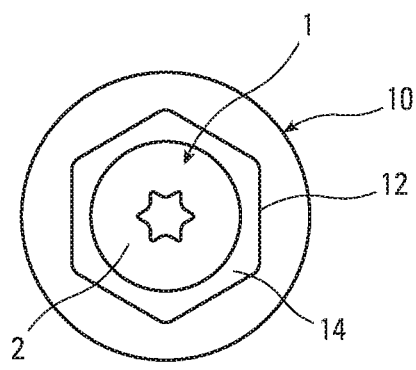
FIG. 13 is a top view of the screw shown fully inserted into one washer of the present invention as shown in FIG. 8.
Figure 14:
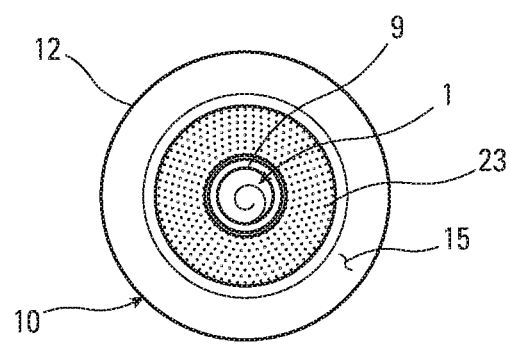
FIG. 14 is a bottom view of the screw shown fully inserted into one washer of the present invention.
Figure 15:
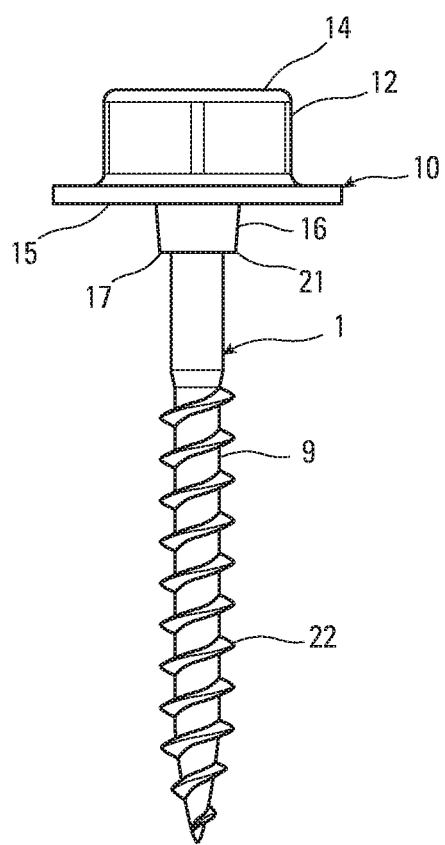
FIG. 15 is a front view of the embodiment shown in FIGS. 8, 13 and 14.
Figure 16:
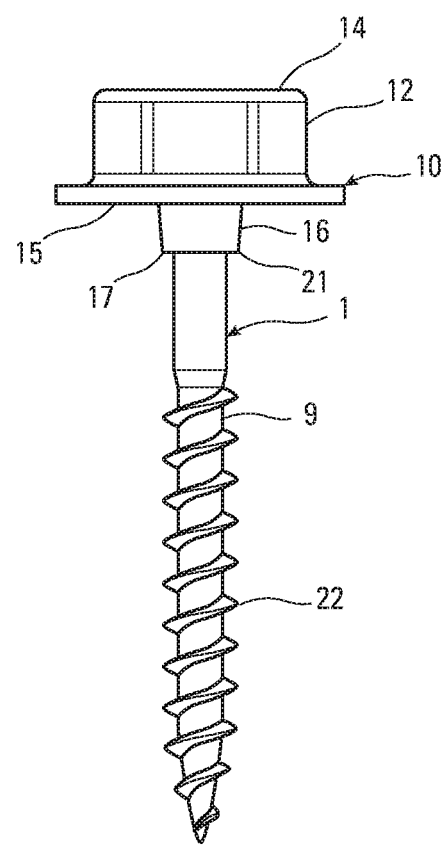
FIG. 16 is a side view of the embodiment shown in FIGS. 8, 13 14, and 15.

As shown in FIGS. 3, 5 and 10, the extending tube 16 of the washer 10 has a distal edge 21 where it projects farthest from the central body 12 and the distal edge 13 is formed to cut into the anchoring structural member 4.

Preferably, the washer 10 is hard enough that it resists being deformed by the fastener 1 when the underside 18 of the head 2 of the fastener 1 interfaces with the bearing surface 20 of the central body 12 of the washer 10.

Figure 17:
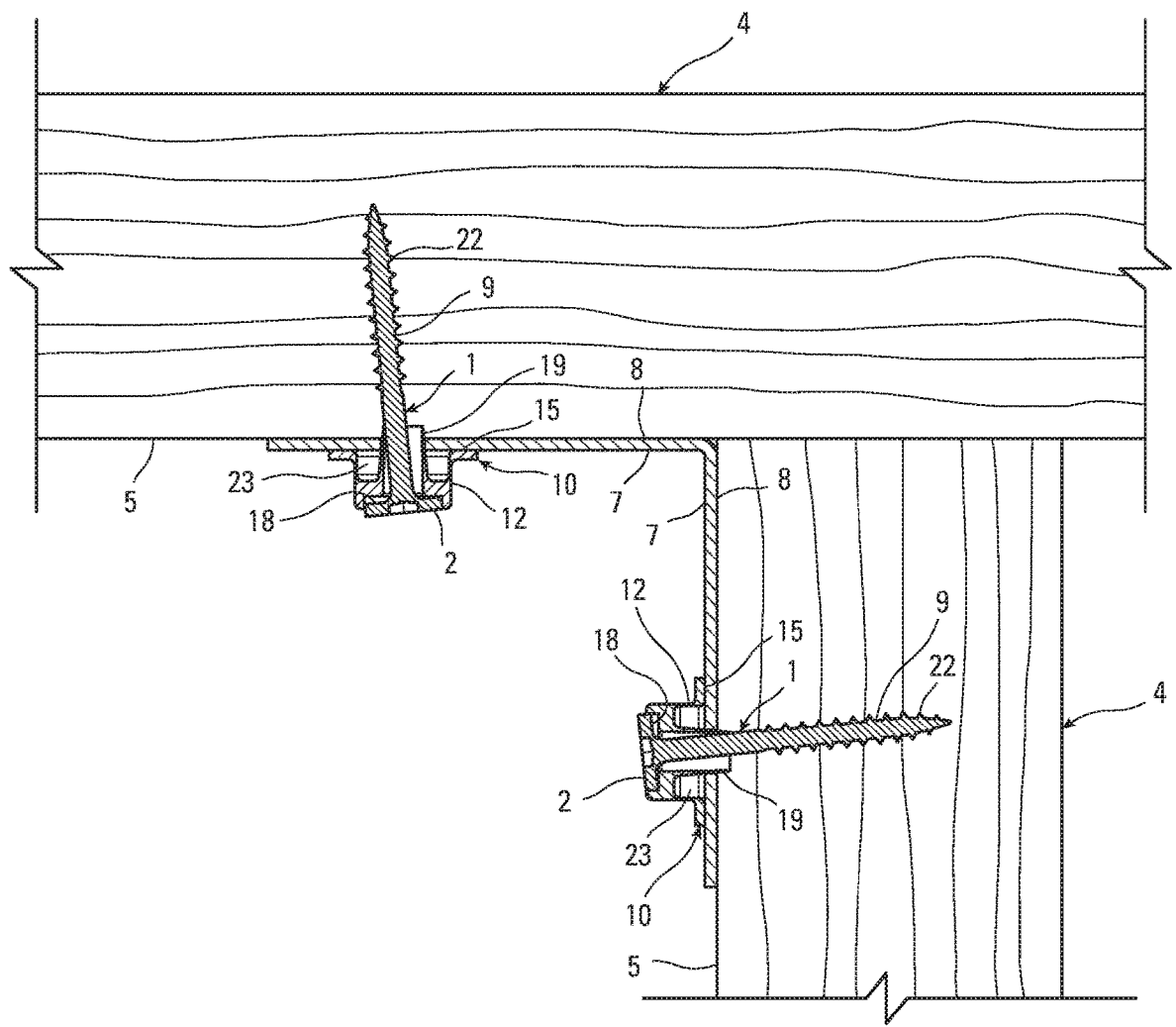
FIG. 17 is a sectional, side view of the connection similar to that shown in FIG. 1, except the screws have been installed slightly askew.
Figure 18:
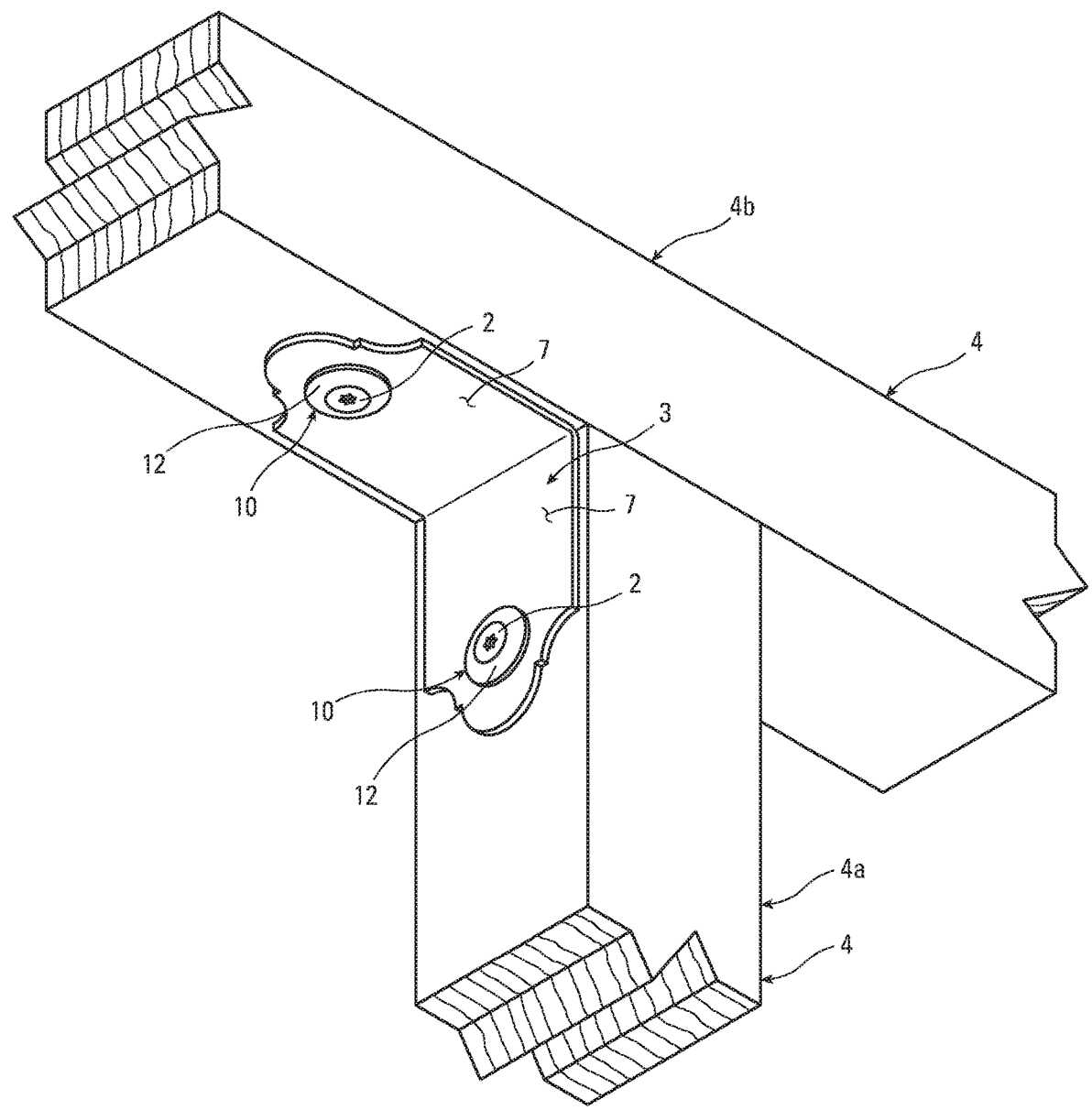
FIG. 18 is a perspective view of a connection made according to the present invention, showing an alternate washer embodiment.
Figure 19:
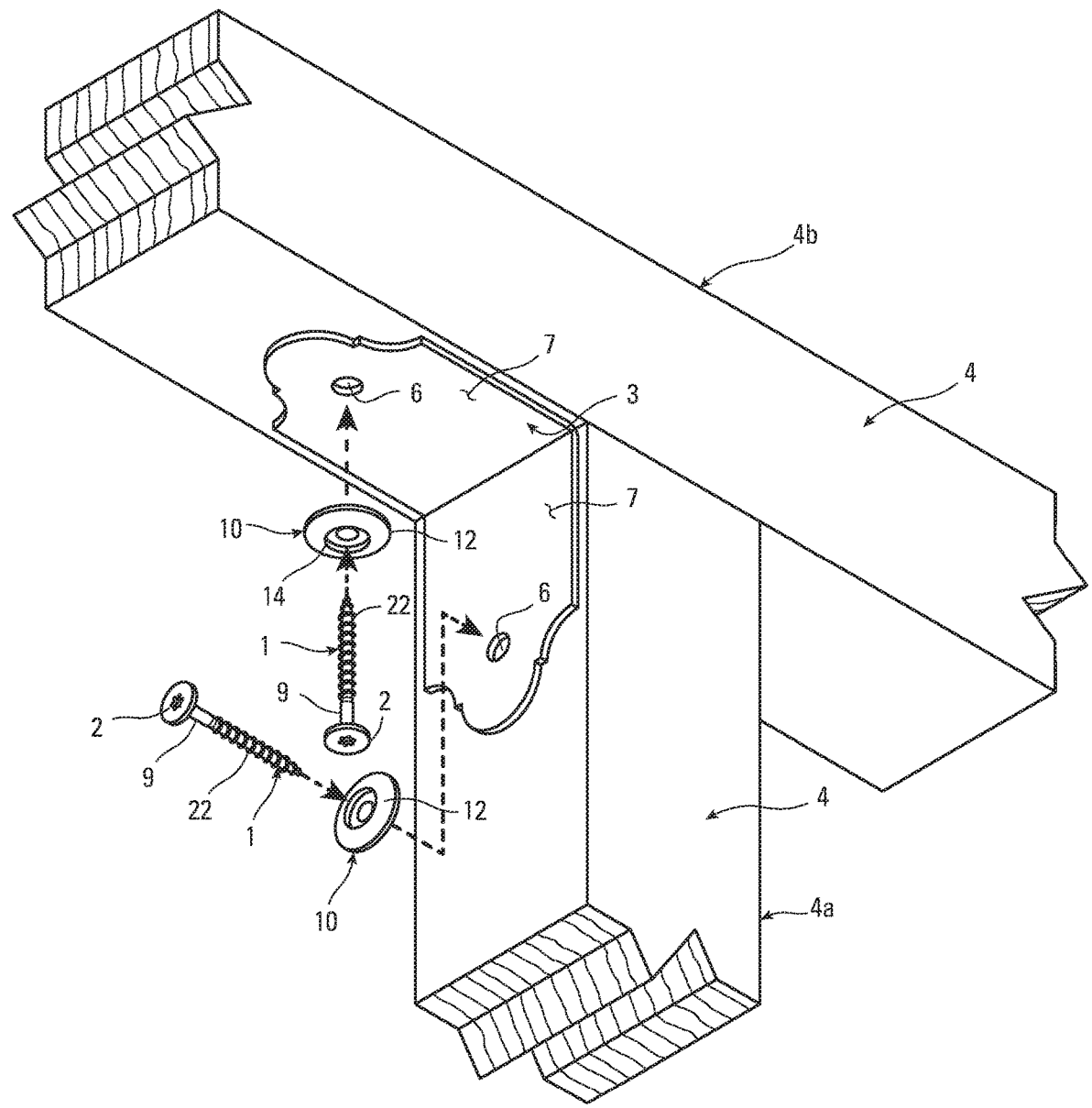
FIG. 19 is an exploded, perspective view of a connection made according to the present invention shown in FIG. 18.
Figure 20:
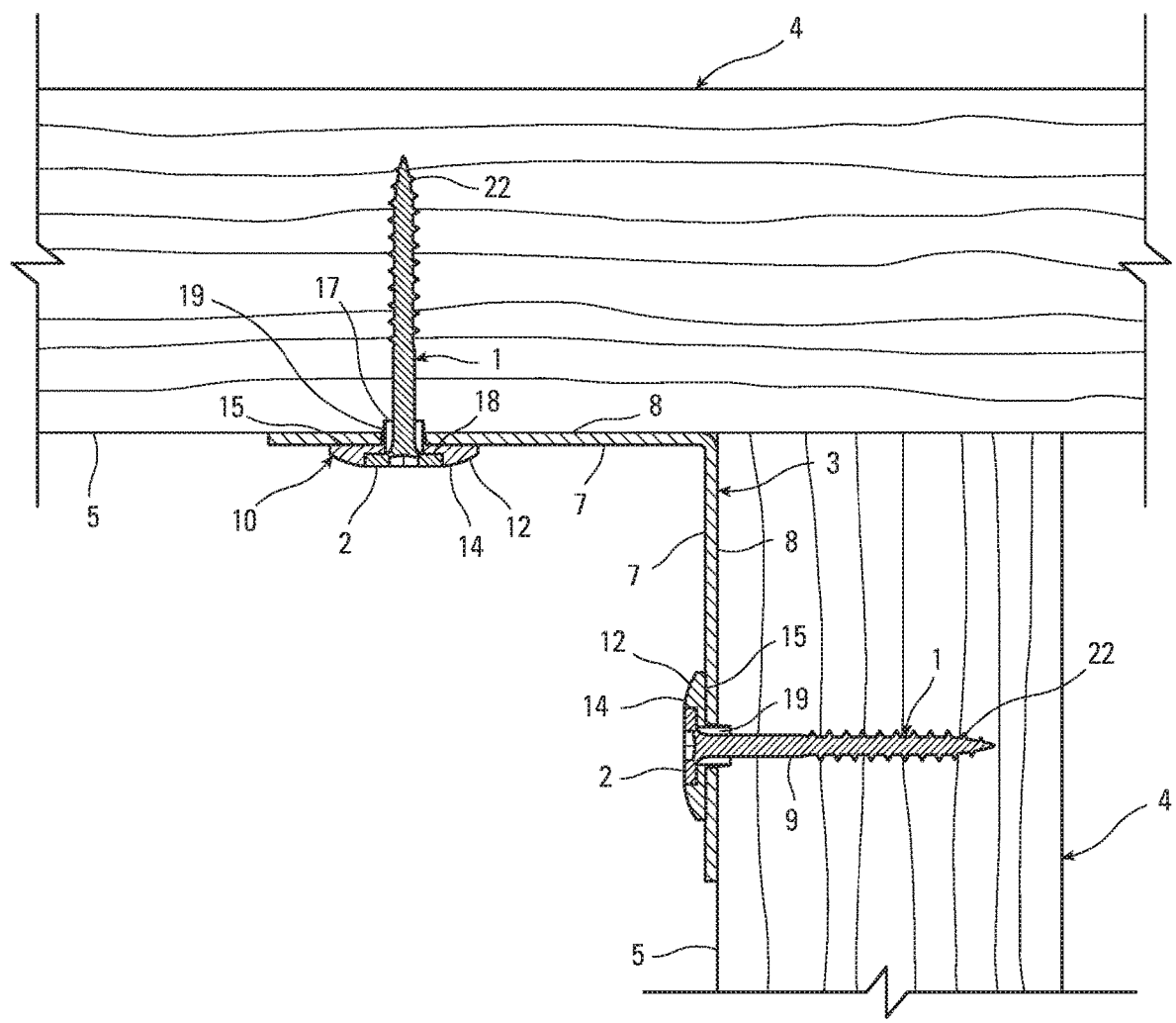
FIG. 20 is a sectional, side view of the connection shown in FIG. 18.
Figure 26:
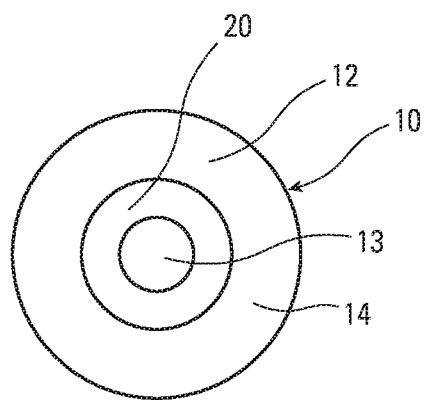
FIG. 26 is a top view of the separate washer of FIG. 21 that forms part of the present invention.
Figure 27:
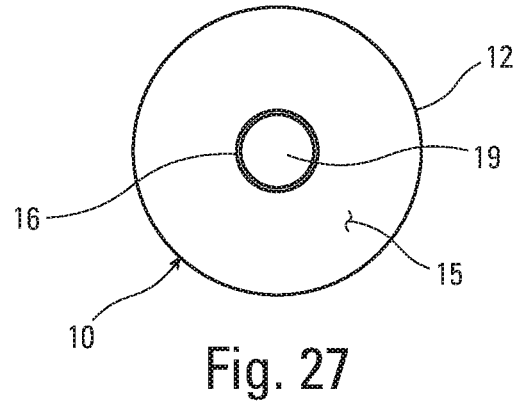
FIG. 27 is a bottom view of the separate washer of FIG. 21 that forms part of the present invention.
Figure 28:
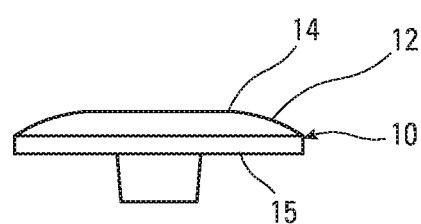
FIG. 28 is a side view of the separate washer of FIG. 21 that forms part of the present invention.
Figure 29:
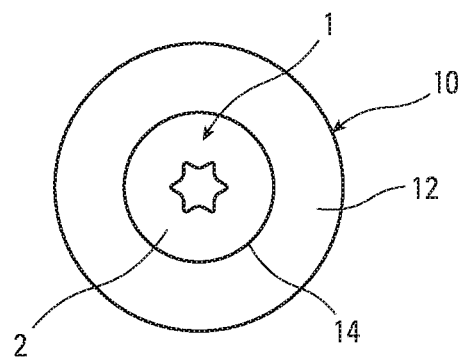
FIG. 29 is a top view of the screw shown fully inserted into one washer of the present invention as shown in FIG. 25.
Figure 30:
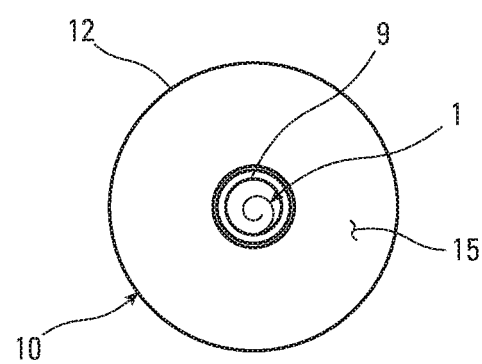
FIG. 30 is a bottom view of the screw shown fully inserted into one washer of the present invention.
Figure 31:
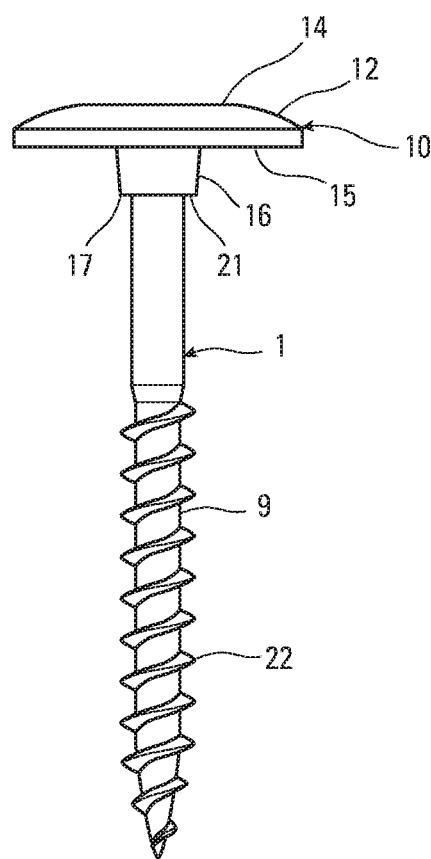
FIG. 31 is a side view of the embodiment shown in FIGS. 25, 29 and 30.
Figure 32:
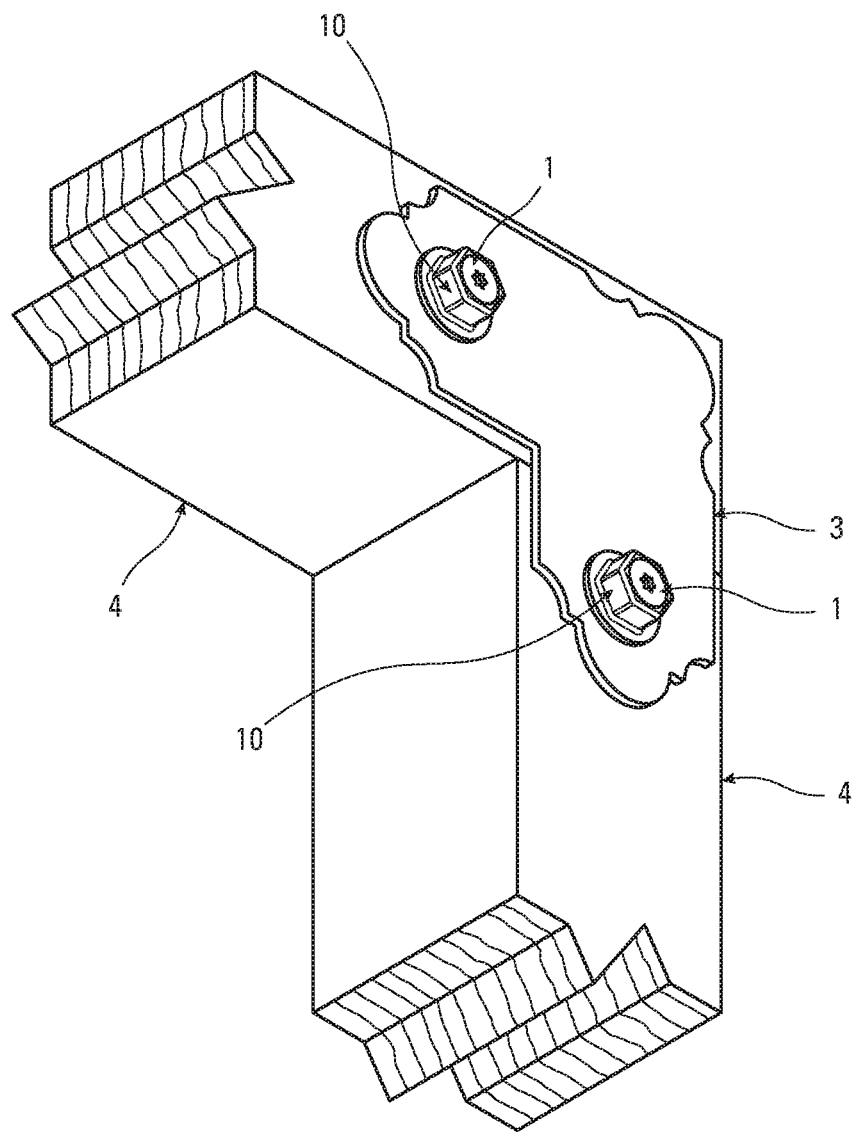
FIG. 32 is a perspective view of an alternate connection made according to the present invention.
Figure 33:
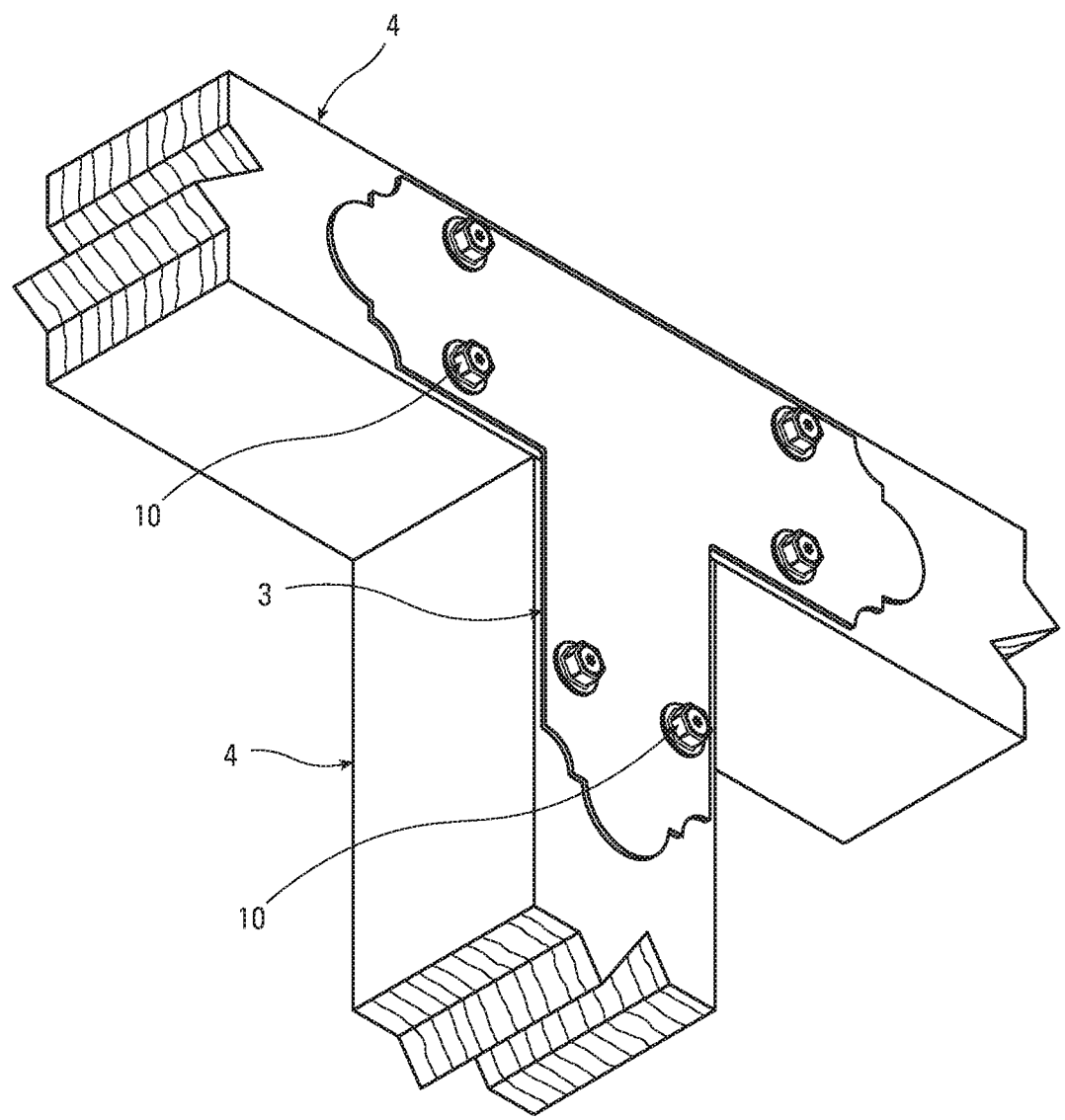
FIG. 33 is a perspective view of an alternate connection made according to the present invention.
Figure 34:
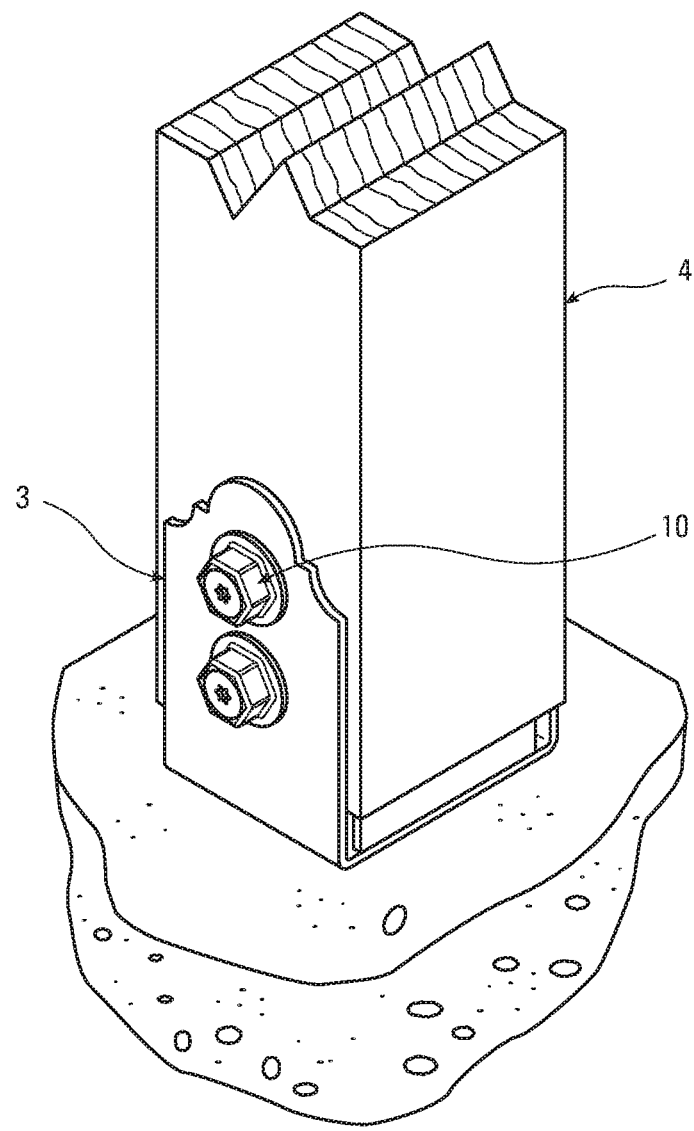
FIG. 34 is a perspective view of an alternate connection made according to the present invention.
Figure 35:
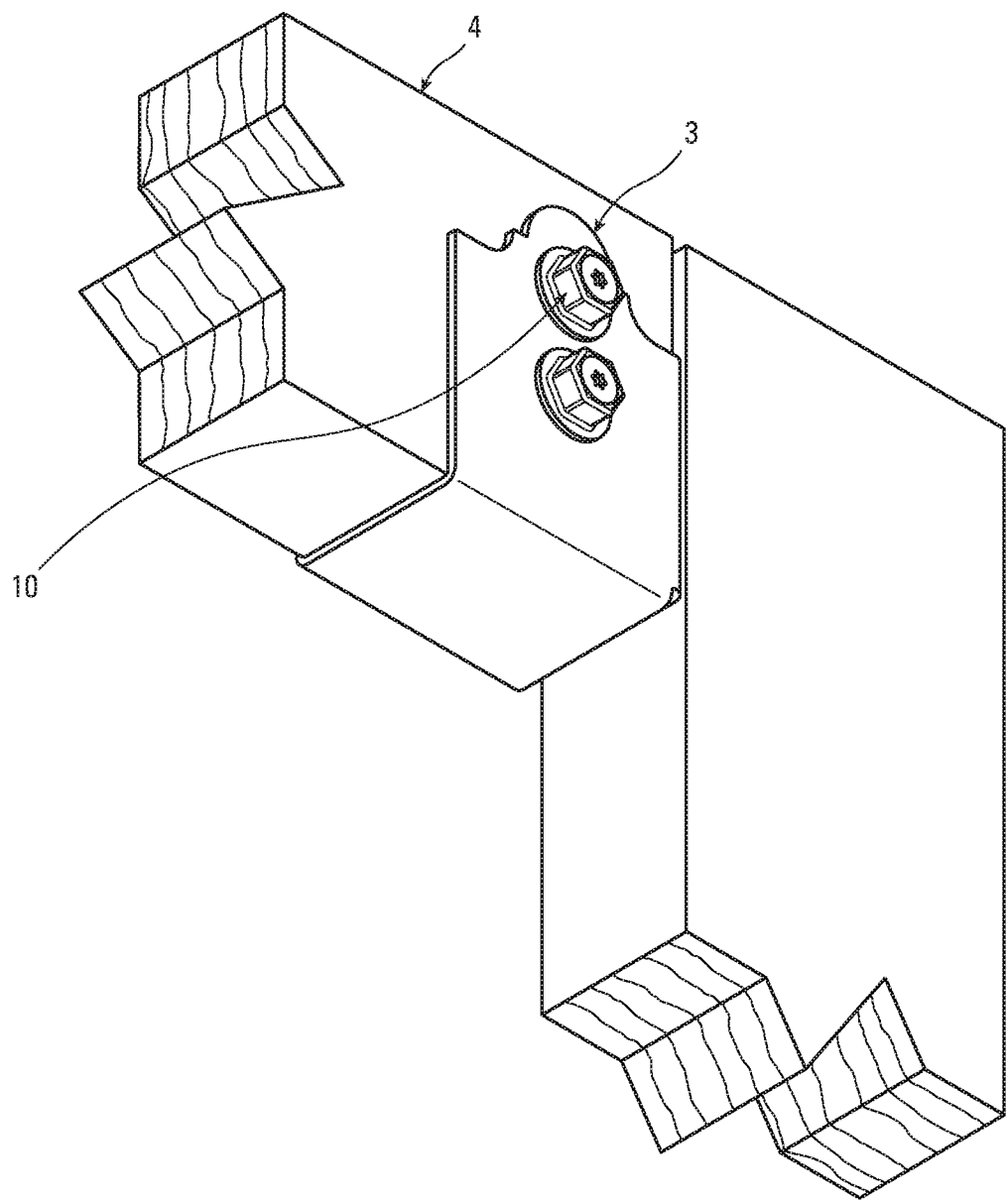
FIG. 35 is a perspective view of an alternate connection made according to the present invention.
Figure 36:
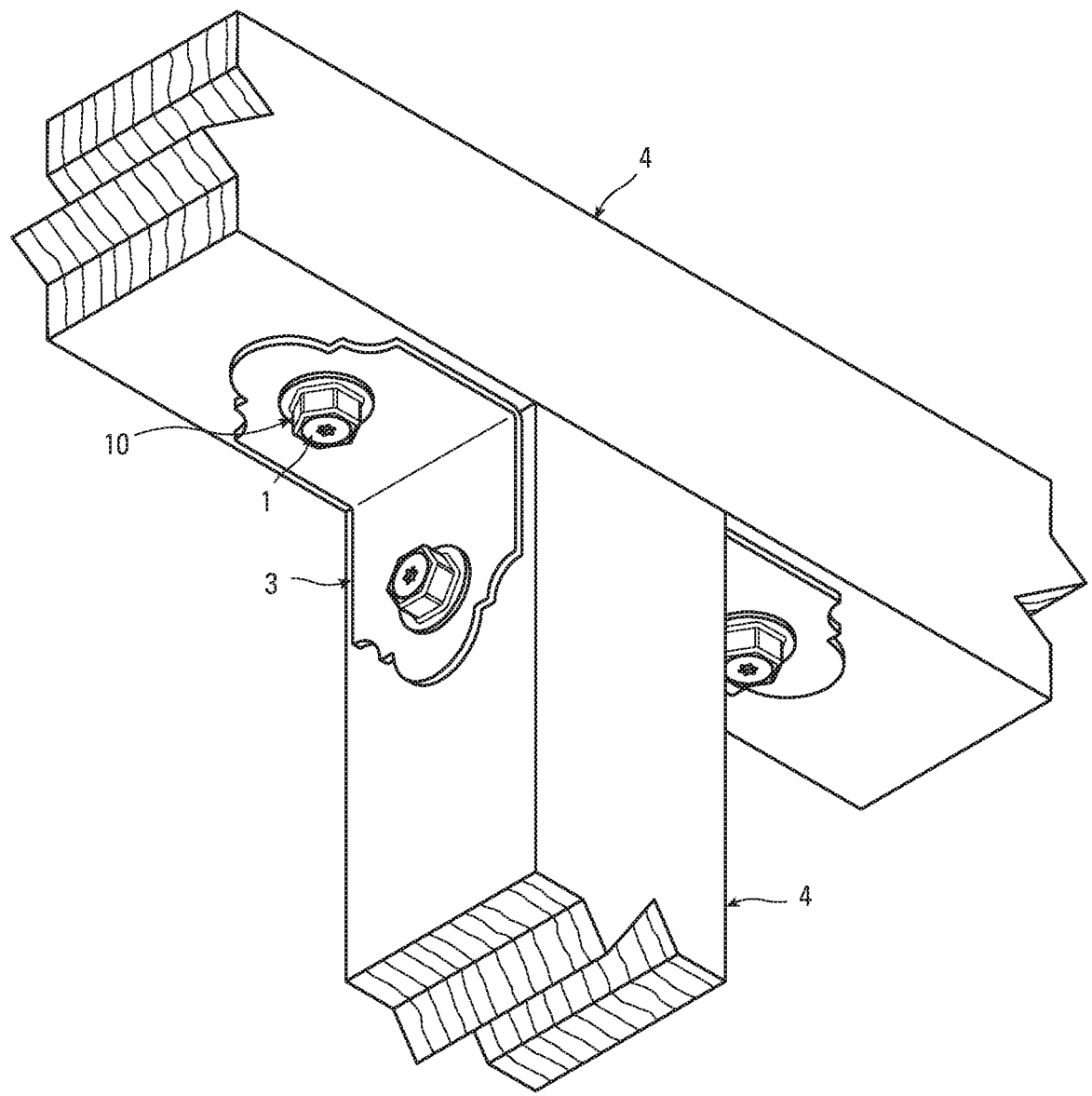
FIG. 36 is a perspective view of an alternate connection made according to the present invention.
Figure 37:
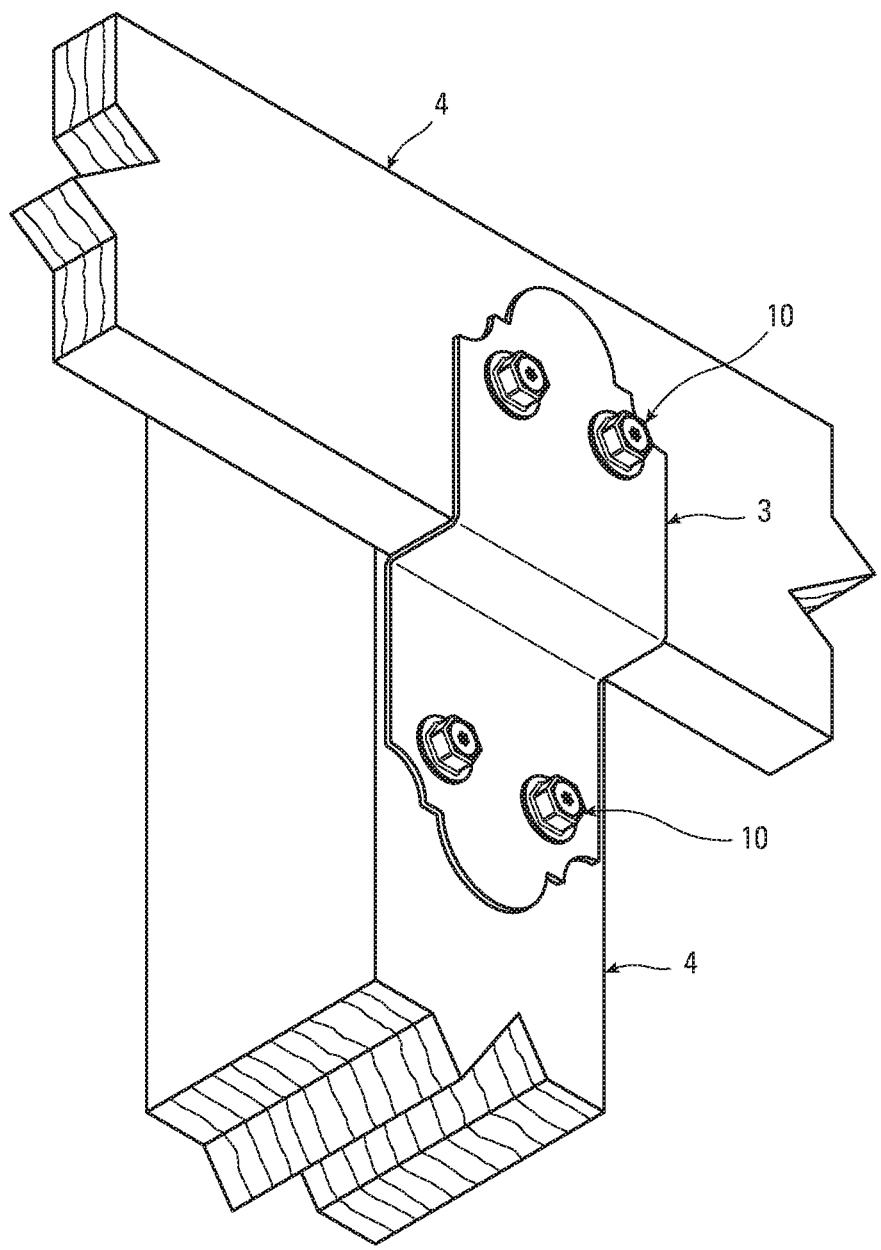
FIG. 37 is a perspective view of an alternate connection made according to the present invention.
Figure 38:
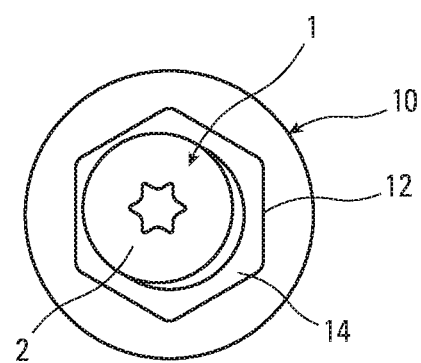
FIG. 38 is a top view of the screw shown fully inserted into one washer of the present invention.

As shown in FIG. 17, the extending shank 9 of the fastener 1 can make contact with the passage 19 of the extending tube 16.

As shown in FIG. 2, the fastener 1 has a thread 22 that interlocks with the anchoring structural member 4.

As shown in FIG. 3, preferably, the bottom surface 15 of the central body 12 of the washer 10 is a flat surface, and the upper surface 7 of the upper member 3 where it interfaces with the bottom surface 15 of the central body 12 of the washer 10 is a flat surface. In the preferred embodiment, the upper surface 5 of the anchoring structural member 4 is also a flat surface.

As shown in FIG. 5, the central body 12 can be formed with an annular cavity 23 that surrounds the passage 13 through the central body 12.

As shown in FIG. 1, the upper member can be a connector 3, and the upper member 3 receives a plurality of fasteners 1 that connect the upper member 3 to a plurality of anchoring structural members 4a and 4b.

The lower, cutting edge 17 of the extending tube 16 cuts or compresses the wood fibers of the anchoring structural member 4 when it is made from wood.

To install, the washer 10 is positioned on the 4 anchoring structural member at a desired location. The fastener 1 is driven into the anchoring structural member 4 through the passage 13 in the washer 10 until the head 2 of the fastener 1 rests against the bearing surface 20 of the washer 10. The fastener 1, connector 3 and the washer 10 can all be made from steel.

We claim:

1. A connection between an anchoring structural member and an upper member, the connection comprising:
   a. the anchoring structural member having an upper surface;
   b. the upper member, the upper member having a upper surface and a lower surface, the lower surface of the upper member interfacing with the upper surface of the anchoring structural member, the upper member having a passage between the upper surface and the lower surface;
   c. a washer, the washer having a central body with a passage through the central body, the central body having a bottom surface with the bottom surface of the central body interfacing with the upper surface of the upper member without deforming the upper surface of the upper member, the central body also having a bearing surface opposed to the bottom surface of the central body, the washer also having an extending tube that extends from the central body and extends past the bottom surface of the central body, the extending tube having a passage that communicates with the passage through the central body, the extending tube of the washer being received by the passage of the upper member without deforming the passage of the upper member;
   d. a fastener having a head and an extending shank, the extending shank of the fastener being received in the anchoring structural member and passing through the passage in the upper member and the passage in the extending tube and the passage in the central body of the washer, the head of the fastener having an underside that interfaces with the bearing surface of the central body of the washer; and
   e. the extending tube closely interfaces with the passage in the upper member.

2. The connection of claim 1, wherein:
the washer is hard enough that it resists being deformed by the fastener when the underside of the head of the fastener interfaces with the bearing surface of the central body of the washer.

3. The connection of claim 2, wherein:
   a. the bottom surface of the central body of the washer is a flat surface; and
   b. the upper surface of the upper member where it interfaces with the bottom surface of the central body of the washer is a flat surface.

4. The connection of claim 3, wherein:
the upper surface of the anchoring structural member is a flat surface.

5. The connection of claim 4, wherein:
the central body has an annular cavity that surrounds the passage through the central body.

6. The connection of claim 5, wherein:
the upper member is a connector, and the upper member receives a plurality of fasteners that connect the upper member to a plurality of anchoring structural members.

7. The connection of claim 6, wherein:
the fastener has a thread that interlocks with the anchoring structural member.

8. The connection of claim 1, wherein:
the extending shank of the fastener makes contact with the passage of the extending tube.

9. The connection of claim 8, wherein:
the washer is hard enough that it resists being deformed by the fastener when the underside of the head of the fastener interfaces with the bearing surface of the central body of the washer.

10. The connection of claim 9, wherein:
   a. the bottom surface of the central body of the washer is a flat surface; and
   b. the upper surface of the upper member where it interfaces with the bottom surface of the central body of the washer is a flat surface.

11. The connection of claim 10, wherein:
the upper surface of the anchoring structural member is a flat surface.

12. The connection of claim 11, wherein:
the central body has an annular cavity that surrounds the passage through the central body.

13. The connection of claim 12, wherein:
the upper member is a connector, and the upper member receives a plurality of fasteners that connect the upper member to a plurality of anchoring structural members.

14. The connection of claim 13, wherein:
the fastener has a thread that interlocks with the anchoring structural member.

15. The connection of claim 1, wherein:
the washer is hard enough that it resists being deformed by the fastener when the underside of the head of the fastener interfaces with the bearing surface of the central body of the washer.

16. The connection of claim 15, wherein:
a. the bottom surface of the central body of the washer is a flat surface; and
b. the upper surface of the upper member where it interfaces with the bottom surface of the central body of the washer is a flat surface.

17. The connection of claim 16, wherein:
the upper surface of the anchoring structural member is a flat surface.

18. The connection of claim 17, wherein:
the central body has an annular cavity that surrounds the passage through the central body.

19. The connection of claim 18, wherein:
the upper member is a connector, and the upper member receives a plurality of fasteners that connect the upper member to a plurality of anchoring structural members.

20. The connection of claim 19, wherein:
the fastener has a thread that interlocks with the anchoring structural member.

\* \* \* \* \*